United States Patent
Monk et al.

(10) Patent No.: US 7,381,287 B2
(45) Date of Patent: Jun. 3, 2008

(54) ADHEREABLE, PRE-FABRICATED, SELF-HEALING, ANTI-PUNCTURE COATING FOR LIQUID CONTAINER AND METHODOLOGY

(75) Inventors: Russell A. Monk, Salem, OR (US); Thomas S. Ohnstad, Salem, OR (US)

(73) Assignee: High Impact Technologies, L.L.C., Tigard, OR (US)

( * ) Notice: Subject to any disclaimer, the term of this patent is extended or adjusted under 35 U.S.C. 154(b) by 82 days.

(21) Appl. No.: 11/438,995

(22) Filed: May 22, 2006

(65) Prior Publication Data

US 2006/0269702 A1   Nov. 30, 2006

Related U.S. Application Data

(60) Provisional application No. 60/684,331, filed on May 24, 2005.

(51) Int. Cl.
*B29C 65/48* (2006.01)
*B32B 37/16* (2006.01)
*B32B 38/04* (2006.01)
*F17C 3/00* (2006.01)
*F17C 13/00* (2006.01)

(52) U.S. Cl. ............. 156/256; 220/560.02; 220/560.03

(58) Field of Classification Search ................ 156/256, 156/258, 267; 220/560.02, 560.03; 428/102
See application file for complete search history.

(56) References Cited

U.S. PATENT DOCUMENTS

| | | | |
|---|---|---|---|
| 2,403,836 A | 7/1946 | Wagner | |
| 2,605,138 A | 7/1952 | Paasche | |
| 3,606,154 A | 9/1971 | Tufts | |
| 3,664,904 A | 5/1972 | Cook | |
| 3,676,197 A | 7/1972 | Harrison et al. | |
| 3,698,587 A | 10/1972 | Baker et al. | |
| 4,197,092 A | 4/1980 | Bretz | |
| 4,216,803 A | 8/1980 | Hall | |
| 4,592,966 A * | 6/1986 | Prior et al. | ............. 428/689 |
| 5,306,867 A | 4/1994 | Connole et al. | |
| 5,472,743 A | 12/1995 | Daluise | |
| 6,040,356 A | 3/2000 | Kanki et al. | |
| 6,432,882 B1 | 8/2002 | Yamamoto | |
| 6,607,621 B1 * | 8/2003 | Swanson | ................ 156/94 |
| 6,803,400 B1 | 10/2004 | Butterbach et al. | |
| 7,169,452 B1 | 1/2007 | Monk et al. | |
| 2005/0084334 A1 | 4/2005 | Shi et al. | |

* cited by examiner

*Primary Examiner*—Philip C Tucker
*Assistant Examiner*—Sing P Chan
(74) *Attorney, Agent, or Firm*—Jon M. Dickinson, PC; Robert D. Vartiz, PC

(57) ABSTRACT

A bulk, generally elastomeric and pliable, layered mat formed to permit selective trimming into size-chosen mat trims/tiles, each of which is structured to perform as a self-puncture(wound)-sealing, defined-liquid-reactive, anti-puncture-leakage coating element applicable bondedly to the outside surface of a selected wall in a container holding the defined-liquid. Also disclosed is a method for protecting against liquid leakage from a puncture wound in such a wall including: (a) preparing a generally elastomeric, pliable, layered coating mat of a self-puncture-healing, defined-liquid-reactive, anti-puncture-leakage material; (b) in relation to a selected container wall, selectively removing, by trimming, from the prepared mat one or more mat trims/tiles shaped for specific use on the outside surface of that wall; and (c) applying and surface-bonding the one or more trims/tiles to the outside surface of the selected wall.

9 Claims, 1 Drawing Sheet

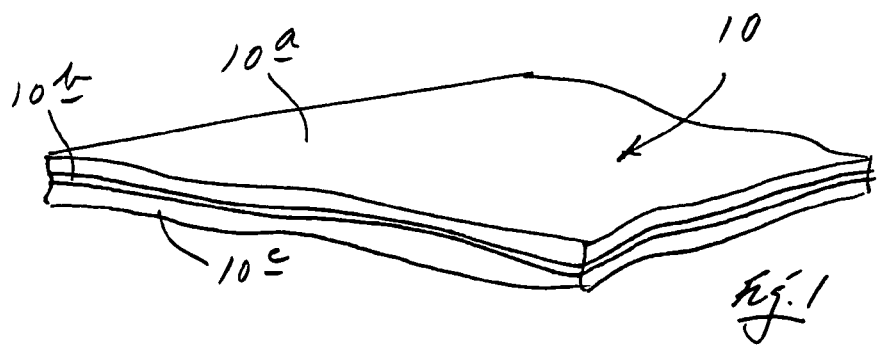
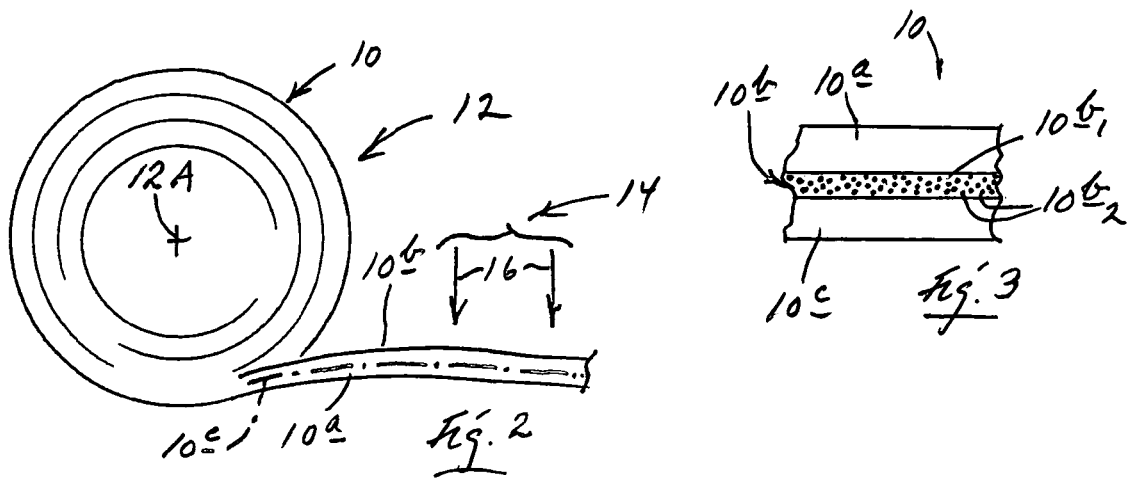
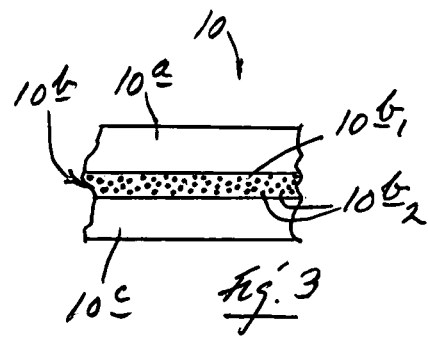
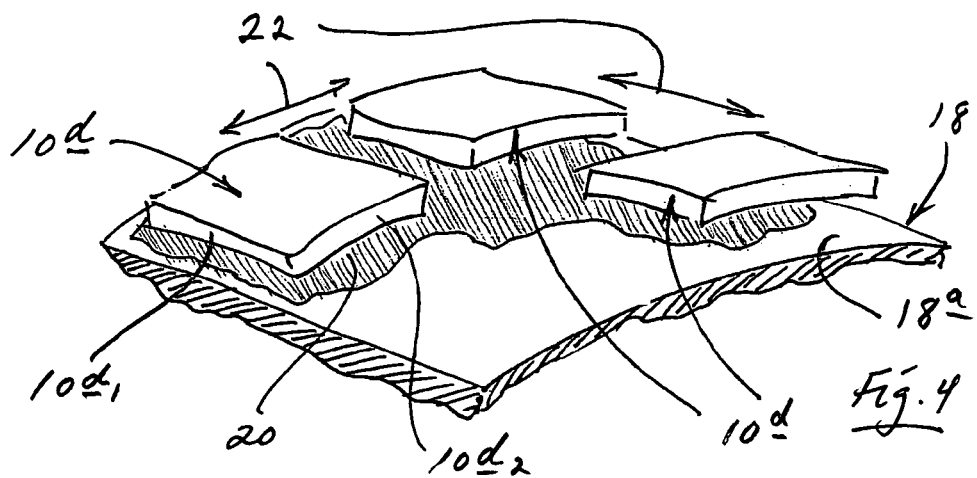

ADHEREABLE, PRE-FABRICATED, SELF-HEALING, ANTI-PUNCTURE COATING FOR LIQUID CONTAINER AND METHODOLOGY

CROSS REFERENCE TO RELATED APPLICATIONS

This application claims priority to currently pending U.S. Provisional Patent Application Ser. No. 60/684,331, filed May 24, 2005, for "Adhereable Pre-Fabricated, Self-Healing Anti-Puncture Coating for Liquid Container". All of the disclosure content in that provisional application is hereby incorporated herein by reference.

BACKGROUND AND SUMMARY OF THE INVENTION

This invention relates to a method and an associated structure involving a prefabricated coating mat material from which pieces, called trims and tiles herein, may be cut to shape, and applied by adhesive bonding to the outside surface of the wall in a liquid container holding a defined-liquid, for the purpose of providing rapid self-healing of a container-wall puncture wound, such as a bullet wound. For the purpose of exposition herein, a preferred embodiment of, and manner of practicing, the present invention are described in a military setting, wherein what is to be protected against leakage, by use of the present coating, is some form of petrol-chemical fuel container, such as a field storage container, a vehicle tanker container, a vehicle fuel tank, etc. In this setting the present invention in all of its aspects has been found to offer particular utility.

Puncture wounds of the walls of defined-liquid-holding containers present serious issues which need to be addressed, particularly where the liquid that is stored, referred to herein as a defined-liquid, is flammable and dangerous, and with respect to which an uncontrolled and massive leakage escape of this fluid can take place. In a military setting, protection of petrol-chemical fuel containers is important in a combat zone where an enemy may wish to disrupt military activities by puncturing and igniting dangerous liquid, such as petrol-chemical fuel.

In this setting, and in fact in relation to any other relevant setting, the present invention proposes a unique, pre-fabricated, plural-layer, mat-like coating material which can be delivered to a use site for the cutting out therefrom of what are referred to herein as trims or tiles of material that are then applied, typically in an edge-to-edge abutting manner, to the outside surface of the wall in a container which is to be protected. Application of such tiles is performed preferably utilizing an adhesive bonding agency. Preparation of such a coating herein takes the form of preparing, in a pre-fabrication mode, what is referred to as a bulk, layered mat of material—and particularly, a material which is generally pliable and elastomeric in nature, and functionally reactive (as will later be explained herein) to the specific defined-liquid which is held in a subject, protected container. Bulk preparation of large quantities of useable coating material, as contemplated by practice of the present invention, promotes an easy task of creating "non-specifically-shaped", yet-undedicated protective coating material which is easily employed at a use site by there cutting out, or trimming, appropriate container-wall conforming shapes of tiles for use in that particular container setting. Bulk coating material prepared in accordance with practice of the present invention may typically and preferably be organized as a deliverable dispense roll of pre-formed mat material from which the mentioned tiles and/or trims may be cut, and then edge-to-edge abutted and bonded to a particular surface which is to be protected.

These and other features and advantages which are offered by the present invention will now become more fully apparent as the description which follows below is read in conjunction with the accompanying drawings.

DESCRIPTION OF THE DRAWINGS

FIG. 1 provides a very simplified, fragmentary illustration of a pre-fabricated, layered mat of coating material prepared in accordance with a preferred embodiment of, and manner of practicing, the present invention.

FIG. 2 is a simplified, fragmentary, schematic side illustration showing a mat of coating material such as that which is illustrated in FIG. 1, assembled as a dispense roll of material suitable for delivering to a job site. Two, bracketed, straight arrows in FIG. 2 represent a cutting or trimming operation to remove size-determined trims or tiles which will be applied, in accordance with practice of the invention, to the outside surface of the wall in a defined-liquid container.

FIG. 3 is a larger-scale, fragmentary view, generally illustrating the mat coating of FIGS. 1 and 2 to be a structure including three preferred layers of material.

FIG. 4 is a fragmentary, schematic view, drawn on about the same scale as that employed in FIG. 2, showing three trims or tiles, rectangularly (squarely) formed, which have been trimmed from a dispense roll of material, such as that shown in FIG. 2, located at the site of a container which is to be protected. These tiles are illustrated in FIG. 4 in conditions still edge-separated, and under a circumstance where they are being applied, and secured through a bonding adhesive, to the fragmentarily pictured surface of a selected, defined-liquid container.

DETAILED DESCRIPTION OF THE INVENTION

Turning now to the drawings, illustrated generally at 10 in FIG. 1 is a fragmentary portion of a prefabricated expanse or mat of multi-layered, anti-leakage coating material which has been prepared in accordance with practice of the present invention. This mat is preferably prepared as a united assembly of three layers including two outer layers $10a$, $10b$, and a bracketed, intermediate, or central, layer $10c$. In FIG. 2, central layer $10c$ is simply represented by a dash-dot line. While different layer formations may be employed in accordance with practice of the present invention, the three-layer arrangement shown in the figures herein has be found to be a very effective arrangement.

In the particular layer arrangement shown herein, each of outer material layers $10a$, $10c$ is suitably spray-formed of a high-tensile-strength, high-elastomeric material, such as the two-component polyurethane elastomer product called TUFF STUFF® FR made by Rhino Linings USA, Inc.—a company based in San Diego, Calif. Intermediate layer $10b$ is formed with a principal, high-tensile-strength, high-elastomeric component $10b_1$ which acts as an embedding material for a large plurality of distributed and embedded liquid imbiber elements (beads) $10b_2$. Elastomer material $10b_1$ is preferably formed of the same, just-mentioned Rhino Linings material which is used by itself alone in outer layers $10a$, $10c$. The embedded liquid imbiber beads $10b_2$ preferably take the form of the bead material product known as IMB230300 made by Imbibitive Technologies America, Inc. in Midland, Mich. The weight percentage of liquid imbiber beads in layer 10c is about 20%. Layer 10b is also preferably spray-formed.

The overall thickness of mat 10 herein is about ⅝-inches, with each of the two outer layers, 10a, 10c, having a thickness of about ¼-inches, and with intermediate layer 10b having a thickness of about ⅛-inches.

It should be understood that mat 10 may be formed with a different overall layer arrangement, layer thickness, and that the internal layer thicknesses may differ from those mentioned above. The employed liquid-imbiber beads content may also be chosen to be different that those specifically identified above.

It is preferable that the materials chosen to form the layers in mat 10 be materials which are reactive to the kind of liquid whose leakage from a punctured container wall is to be stopped. The above-identified materials have been chosen for illustration herein because of the fact that they are usefully reactive to petrol-chemical fuel. More will be said about this later herein.

While any suitable procedure any be employed for the pre-fabrication creation of layered coating mat 10, spray-creation, as suggested above, has been found to be a very preferable and effective method for manufacture. The materials identified above which make up layers 10a, 10b, 10c in mat 10 are, as earlier indicated, reactive to petrol-chemical fuel—a liquid which is now being used as a representative example of a defined-liquid contained in a container to be protected. These materials, after spray formation and "curing", react to a puncture wound, and specifically to petrol-chemical fuel leakage through such a puncture wound, to absorb leakage liquid, and effectively to coagulate in a manner forming, in cooperation with high elasticity in the Rhino Linings material present in the three layers, a puncture-closing barrier which quickly closes off such a wound. It should be understood that these specific layer materials do not form part of the present invention, and that other materials may be employed, with these other materials being chosen, as much as possible, to be reactive in the manner described above, or in somewhat like manners, with respect to contact with leakage fluid of a particular defined type for which these layers in the mat of the invention are intended for protection use.

While a prepared coating mat, such as mat 10, may be delivered in any appropriate fashion to a use site, a preferred manner of preparation for delivery involves forming prepared mat 10 into the configuration of a dispense roll, such as that shown generally at 12 in FIG. 2. The roll "axis" of roll 12 is shown at 12A in this figure. At a use site, and particularly at the site of a container whose wall is to be outside-surface coated, and thus protected, with roll 12 delivered and in place at that site, in any appropriate manner, trims, or tiles, such as the three, generally square tiles shown at 10d in FIG. 4, are cut out from the bulk, rolled mat material, as is generally illustrated in FIG. 2 by a bracket 14, and by two, downwardly pointing arrows 16.

In FIG. 4, shown fragmentarily at 18 is the wall of a petro-chemical container which is to be protected by the coating of this invention. Trims, or tiles, such as those shown at 10d in FIG. 4, are applied to the outer surface 18a in container wall 18 through a suitable bonding agency 20 which preferably takes the from of a two-part, urethane, exothermic-reaction, bonding adhesive of conventional manufacture. Tiles cut from roll 12 are appropriately laid onto a film 20 of such adhesive, and, as indicated by double-headed arrows 22, are placed and/or shifted into edge-to-edge abutting relationship with respect to their adjacent, confronting edges, such as the two edges shown at $10d_1$ and $10d_2$ in one of tiles 10d. An exothermic-reaction (chemical) bonding adhesive, like that just generally mentioned, is, we believe, the most appropriate kind of adhesive to employ in the setting now being desired, in order to allow for quick, abutting, edge-to-edge placement of coating tiles (also referred to herein as coating elements), which placement, of course, denies air exposure to the underlying covered area of surface 18a. An exothermic-reaction adhesive, such as the mentioned two-component urethane adhesive, will properly cure in the absence of air exposure.

Thus the invention proposes very unique prefabricated coating material, and an associated methodology, usable for applying an anti-leakage, anti-puncture-wound protective coating to the outside surface of a selected, defined-liquid container, such as a petrol-chemical fuel container. The invention offers a remarkably simple and convenient manner for deploying appropriate protective coatings, and applying them to many different kinds of container walls. This method allows, further, for easy shape-determined trimming of coating tiles for appropriate fitment onto the outside surface of a to-be-protected container.

While a preferred embodiment of, and manner of practicing, the present invention, have been illustrated and described herein, it is appreciated that variations and modifications, some of which have been suggested above, may be made without departing from the spirit of the invention.

We claim:

1. A method for protecting against liquid leakage from a puncture in the wall of a defined-liquid container comprising
    preparing, in a pre-fabrication mode, a generally elastomeric and pliable, bulk, layered mat of a self-puncture-healing, defined-liquid-reactive, anti-puncture-leakage coating usable on the outside of the wall in a selected container holding the defined-liquid, said preparing involving creating the mat in three integrated layers including a pair of high-elastomeric-material outer layers joined to and bracketing an intermediate layer defined by a high-elastomeric-material embedding layer which embeds a distribution of plural, defined-liquid imbiber elements,
    delivering the prepared mat to the site of such a wall and container,
    at that site, selectively removing, by trimming, from the delivered mat one or more mat trims/tiles, and
    applying and surface-bonding the one or more mat trims to the outside of the selected container wall.

2. The method of claim 1 which further comprises forming the prepared mat into a dispense roll, and said delivering involves transporting the formed dispense roll to the mentioned site.

3. The method of claim 1, wherein said removing by trimming produces plural mat trims/tiles each having edges, and said applying and surface-bonding includes placing such plural mat trims/tiles in edge-to-edge abutting relationships on the outside of the selected container wall.

4. The method of claim 3, wherein said surface-bonding is performed utilizing a chemical, exothermic-reaction bonding agency.

5. The method of claim 1, wherein both the mentioned high-elastomeric layer material and the defined-liquid imbiber elements are reactive to the defined liquid.

6. A method for protecting against liquid leakage from a puncture in a selected wall in a defined-liquid container comprising preparing, in a pre-fabrication mode, a generally elastomeric and pliable, bulk, layered mat of a self-puncture-healing, defined-liquid-reactive, anti-puncture-leakage coating usable on the outside of the selected wall in the container, said preparing involving creating the mat in three integrated layers including a pair of high-elastomeric-material outer layers joined to and bracketing an intermediate layer defined by a high-elastomeric-material embedding layer which embeds a distribution of plural, defined-liquid imbiber elements, in relation to such a selected wall, selectively removing, by trimming, from the prepared mat one or more mat trims/tiles shaped for specific use on the outside surface of that wall, and applying and surface-bonding the one or more mat trims/tiles to the outside surface of the selected container wall.

7. The method of claim 6 which further comprises forming the prepared mat into a dispense roll, and said delivering involves transporting the formed dispense roll to the site of such a selected container wall.

8. The method of claim 6 which further comprises forming the prepared mat into a dispense roll, and said delivering involves transporting the formed dispense roll to the mentioned site.

9. The method of claim 6, wherein both the mentioned high-elastomeric layer material and the defined-liquid imbiber elements are reactive to the defined liquid.

* * * * *